(12) United States Patent
Matsubara et al.

(10) Patent No.: US 6,589,696 B2
(45) Date of Patent: Jul. 8, 2003

(54) NEGATIVE ACTIVE MATERIAL FOR RECHARGEABLE LITHIUM BATTERY AND METHOD OF PREPARING SAME

(75) Inventors: Keiko Matsubara, Yokohama (JP); Toshiaki Tsuno, Yokahama (JP); Sang-Young Yoon, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 97 days.

(21) Appl. No.: 09/882,449

(22) Filed: Jun. 14, 2001

(65) Prior Publication Data

US 2002/0009646 A1 Jan. 24, 2002

(30) Foreign Application Priority Data

Jun. 16, 2000 (JP) ........................................ 2000-182219

(51) Int. Cl.⁷ ................................................ H01M 4/58

(52) U.S. Cl. ................................. 429/231.8; 429/231.4; 429/232; 429/218.1

(58) Field of Search ........................... 429/231.8, 231.4, 429/232, 218.1

(56) References Cited

U.S. PATENT DOCUMENTS 6,383,686 B1 * 5/2002 Umeno et al. ........... 429/231.8
6,432,583 B1 * 8/2002 Fukuda et al. ........... 429/231.4

* cited by examiner

Primary Examiner—Laura Weiner
(74) Attorney, Agent, or Firm—Christie, Parker & Hale, LLP

(57) ABSTRACT

Disclosed is a negative active material for a rechargeable lithium battery that includes graphite particles, silicon micro-particles attached on the graphite particles and a carbon film partially or totally coated on the graphite particles.

16 Claims, 3 Drawing Sheets

NEGATIVE ACTIVE MATERIAL FOR RECHARGEABLE LITHIUM BATTERY AND METHOD OF PREPARING SAME

CROSS REFERENCE TO RELATED APPLICATION

This application is based on application No. 2000-182219 filed with the Japanese Patent Office on Jun. 16, 2000, the content of which is incorporated herein by reference.

BACKGROUND OF THE INVENTION (a) Field of the Invention

The present invention relates to a negative active material for a rechargeable lithium battery and a method of preparing the same, and to a negative active material for a rechargeable lithium battery having a surface on which is attached silicon micro-particles.

(b) Description of the Related Art

As electronic products tend to be more and more miniature in size, lighter in weight, and higher in quality and performance, a rechargeable lithium battery that is used as a battery for such products should have greater capacity.

Although graphite used as negative active material for the rechargeable lithium battery exhibits the high theoretical capacity of 372 mAh/g, there are still demands to develop a new negative active material exhibiting higher capacity than graphite.

As silicon-lithium alloys have been known to exhibit higher capacity than graphite, silicon and silicon compounds have been suggested for the new negative active material.

Therefore, it has recently been suggested that graphite is physically mixed with micro-particles of silicon compounds, or that silicon compounds are chemically mixed by a silane coupling agent. The silane coupling agent helps to fix the silicon compound on a surface of the graphite.

However, in the case where the physical mixture of graphite and the silicon compound is used as a negative active material, the adhesion strength between the silicon compound and the graphite is low so that the silicon compound may be separated from the graphite due to shrinkage or expansion of the graphite during the charge and discharge. Further, the separated silicon compound is inadequate to use as a negative active material, since the silicon compound has lower ion conductivity.

In the case where a chemical mixture is used for a negative active material, the silicon compound is fixed on the surface of the graphite during charge and discharge so that the silicon compound fixed on the graphite acts as a negative active material. However, this procedure requires a treatment of a silane coupling agent in the preparation of the negative active material, and the resulting negative active material is unstable.

SUMMARY OF THE INVENTION

It is an object of the present invention to provide a negative active material for a rechargeable lithium battery having higher charge and discharge capacity, higher charge and discharge efficiency, and good charge and discharge cycle life characteristics.

It is another object of the present invention to provide a method of preparing a negative active material for a rechargeable lithium battery.

In order to achieve these objects, the present invention provides a negative active material for a rechargeable lithium battery including at least one graphite particle, at least one silicon micro-particle attached on a surface of the graphite particle, and a carbon film coated on the graphite particle and the silicon micro-particle.

The present invention provides a method of preparing a negative active material. In this method, at least one silicon micro-particle is attached to at least one graphite particle and the mixture is coated with a polymer material to form a polymer film on the mixture. The coated mixture (negative active material precursor) is calcined. At this time, the polymer film is carbonized to convert a carbon, thereby producing a negative active material attached silicon microparticle and coated with a carbon film.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
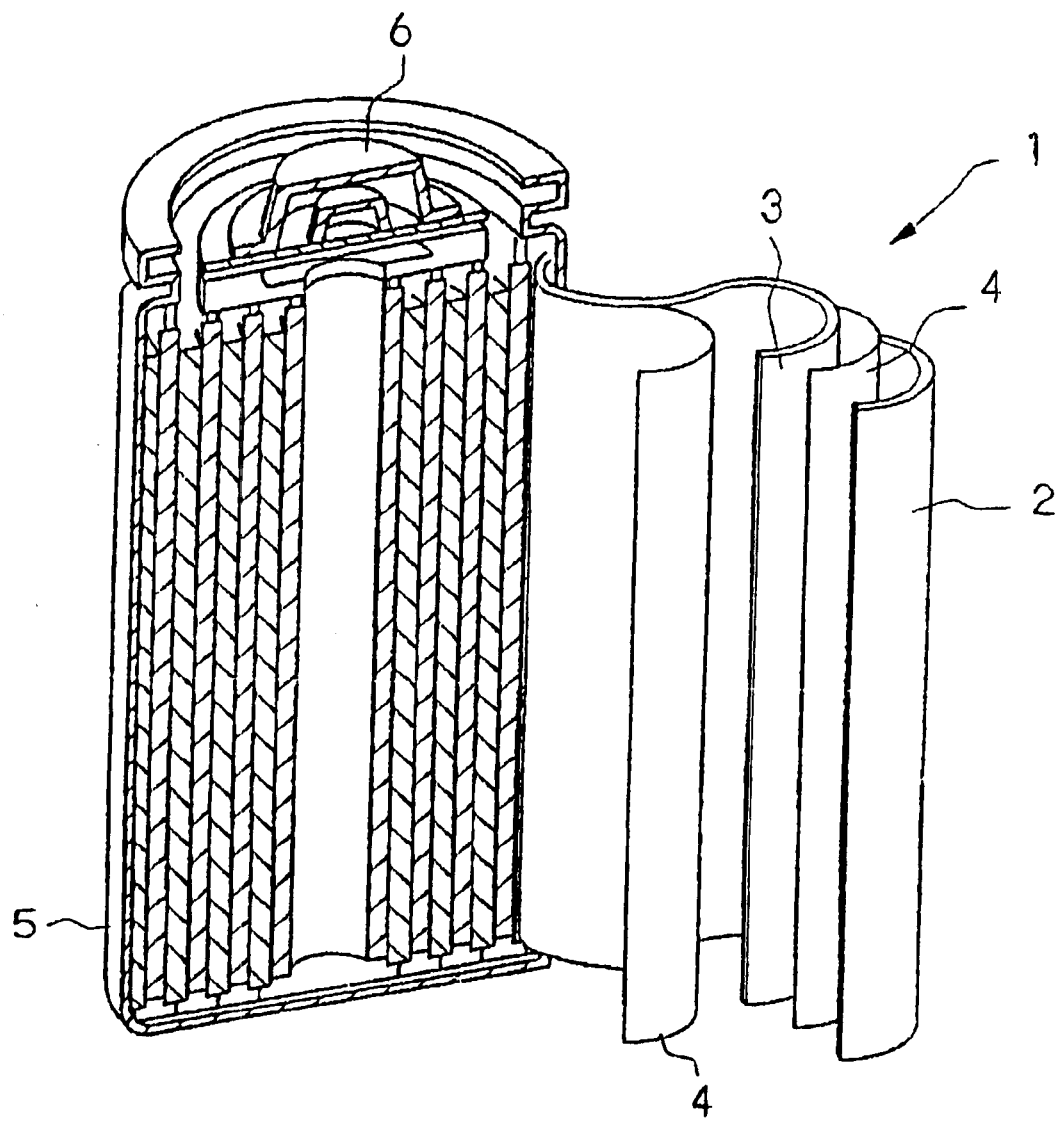
FIG. 1 is a side cross sectional view showing a rechargeable lithium battery according to the present invention.

A negative active material for a rechargeable lithium battery of the present invention includes a graphite particle to which is attached a silicon micro-particle, and a carbon film partially or totally coated on the graphite particle.

The silicon micro-particle is capable of forming an alloy with lithium. The silicon micro-particle may be capable of absorbing or releasing lithium, as does graphite, during the charge and the discharge, and therefore, the energy density of the negative active material can increase.

Since the charge and discharge potential of the silicon micro-particle is similar to that of the graphite particle, and the discharge voltage of the silicon micro-particle is relatively flat, the discharge capacity of the negative active material can be improved.

The flat region of the charge and discharge curve versus lithium is preferably shown to be less than 0.5 V.

Furthermore, the negative active material of the present invention includes silicon micro-particles attached on the surface of a plurality of graphite particles, and a carbon film which is partially ortotally coated on the graphite particles, and which adheres between the graphite particles. Since the graphite particles are adhered by the carbon film, the energy density of the negative active material can be improved.

In addition, it is preferable that the negative active material of the present invention is prepared by coating a mixture of one or more graphite particles and silicon micro-particles with a carbon film. The negative active material of the present invention may also be prepared by coating at least one graphite particle to which is attached a silicon micro-particle with a carbon film, or may be prepared by partially or totally coating a mixture of the graphite particle and the silicon micro-particle with a carbon film.

The negative active material of the present invention includes a plurality of silicon micro-particles adjacently and densely attached on the surface of the graphite particle. Alternatively, the silicon micro-particle may be distantly and loosely attached on the graphite particle.

The content of the silicon micro-particle in the negative active material is preferably from 3 to 10 percent by weight based on the total weight of the negative active material. In the case where the content of the silicon micro-particle is greater than 10 percent by weight, the charge and discharge efficiency of the negative active material decreases. In the case where the content of the silicon micro-particle is less than 3 percent by weight, the energy density of the negative active material decreases.

The carbon film has an amorphous form which does not react with an electrolyte during the charge and discharge so that the decomposition of the electrolyte can be prevented, thereby improving the charge and discharge efficiency of the negative active material.

The carbon film acts as a reaction-prevention layer which prevents reaction between the graphite and the electrolyte.

The negative active material of the present invention includes the carbon film formed on the graphite particle and the carbon film which acts as the reaction-prevention layer and prevents the contact between the graphite and the electrolyte. Therefore, a reaction between the negative active material and the electrolyte does not occur, so that the decomposition of the electrolyte can be prevented and the charge and discharge efficiency can be improved.

The carbon film partially or totally coats the above graphite particles. The carbon film also coats the silicon micro-particle, and helps to firmly attach the silicon micro-particle to the surface of the graphite particle. Therefore, the silicon micro-particle having a relatively high specific resistance is not separated from the graphite particle, and all silicon micro-particles participate in the charge and discharge cycling. Additionally, the above carbon film is formed by calcinating a polymer material that is attached to the graphite particle. Therefore, a uniform and thin carbon film can be formed on the graphite particle, and the carbon film does not prevent a reaction between lithium and the graphite particle, or lithium and the silicon micro-particle.

The polymer material is preferably selected from vinyl resin, cellulose resin, phenol resin, pitch, tar and mixtures thereof, and is more preferably polyvinyl alcohol.

The negative electrode of the present invention includes the negative active material.

The electrode may be produced by forming a negative active material composition including the negative active material, a conductive agent, and a binder, or by coating the composition on a collector such as a copper foil. The negative electrode is not limited as the above mentioned, and may be manufactured through various methods other than the aforementioned.

A rechargeable lithium battery of the present invention includes the negative active material.

The rechargeable lithium battery includes a positive electrode, an electrolyte, a separator, and a negative electrode with the negative active material. The rechargeable lithium battery can be fabricated in various types of shape such as a cylinder, a prism, a disk, and a sheet. The shape of the rechargeable lithium battery is not limited as the above mentioned, and can be variously shaped in various forms other than the aforementioned.

The rechargeable lithium battery including the negative electrode has a higher energy density, a higher discharge capacity, and a longer cycle life.

The positive electrode is produced from a positive active material composition including a positive active material, a conductive agent, and a binder. The positive active material may be a compound in which lithium intercalation reversibly occurs, such as $LiMn_2O_4$, $LiCoO_2$, $LiNiO_2$, $LiFeO_2$, $V_2O_5$, $TiS$, and $MoS$.

As the separator, a porous olefin film such as polyethylene and polypropylene, and polymer electrolyte may be used.

The electrolyte includes an aprotic solvent and a lithium salt in the solvent. The aprotic solvent includes propylene carbonate, ethylene carbonate, butylenes carbonate, benzonitrile, tetrahydrofurane, 2-methyltetrahydrofurane, γ-butyrolactone, dioxolane, 4-methioxolane, N,N-dimethylformamide, dimethylacetamide, dimethylsulfoxide, dioxane, 1,2-dimethoxyethane, sulforane, dichloroethane, chlorobenzene, nitrobenzene, dimethylcarbonate, diethylcarbonate, methyl propylcarbonate, methylisopropylcarbonate, ethylpropylcarbonate, dipropylcarbonate, diisopropyllcarbonate, dibutylcarbonate, diethylenglycol, dimethylether, or a mixture thereof. The lithium salt includes $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlCl_4$, $LiN(C_xF_{2x+1}SO_2)(C_yF_{2y+1}SO_2)$ (where x and y are natural numbers), $LiCl$, or $LiI$.

The negative active material preparation of the present invention will be now illustrated in more detail.

At least one silicon micro-particle is attached to at least one graphite particle and a polymer material is coated on the resulting graphite particle to prepare a negative active material precursor with a polymer film. The precursor is calcined. At this time, the polymer film is carbonized to convert it to a carbon film, thereby producing a negative active material attached with the silicon micro-particle and coated with the carbon film.

The calcination step is performed at a temperature ranging from the carbonization temperature of the polymer material to 1400° C.

According to the method of preparing for the present invention, the silicon micro-particle can be firmly attached on the graphite particle by the carbon film. Additionally, since the precursor is calcined at a temperature of 1400° C. or less, the attached silicon micro-particle is not changed to SiC during the calcination step. The resulting negative active material exhibits good energy density and high discharge capacity at the flat region of the charge and discharge curve.

The polymer material of the present invention may be preferably polyvinyl alcohol. In using polyvinyl alcohol as the polymer material, the calcination temperature is preferably from 800° C. to 1400° C.

An embodiment of a rechargeable lithium battery of the present invention will be illustrated with a reference to the accompanying drawings.

FIG. 1 shows a cylindrical rechargeable lithium battery 1. The rechargeable lithium battery 1 includes a sheet-type negative electrode 2, a sheet-type positive electrode 3, a separator 4 located between the negative electrode 2 and the positive electrode 3, an electrolyte mainly immersed in the positive electrode 2, the negative electrode 3, and the separator 4, a cylindrical battery case 5, and a gasket 6. The rechargeable lithium battery 1 includes the negative electrode 2, the positive electrode 3, and the separator 4. The negative electrode 2, the positive electrode 3 and the separator are referred to as an electrode element. The electrode element is spirally wound and inserted into the battery case 5.

The negative electrode 2 is formed by coating the negative active material composition on a collector such as a copper foil. The negative active material composition includes the negative material of the present invention, a conductive agent as graphite, and a binder such as a polyvinylidenefluoride.

Figure 2:
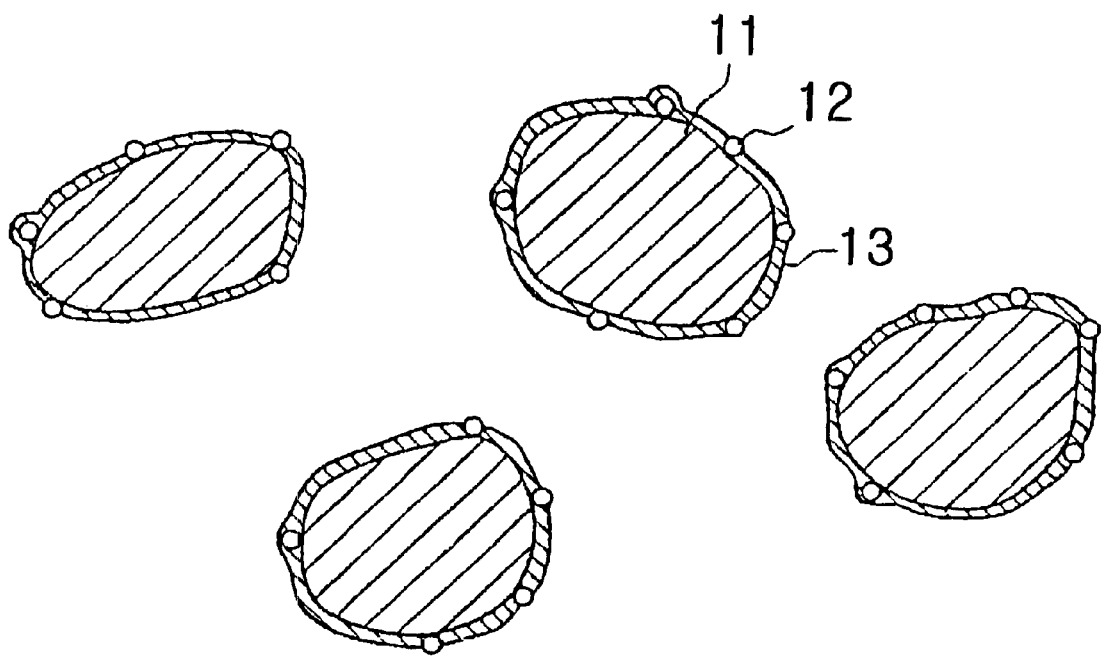
FIG. 2 is a schematic diagram showing a negative active material according to one embodiment of the present invention.
Figure 3:
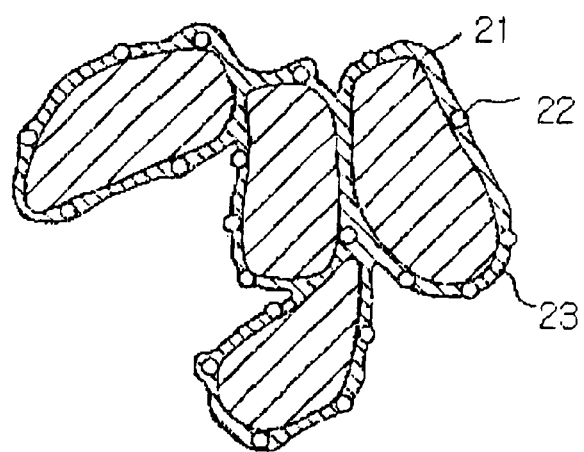
FIG. 3 is a schematic diagram showing a negative active material according to another embodiment of the present invention.
Figure 4:
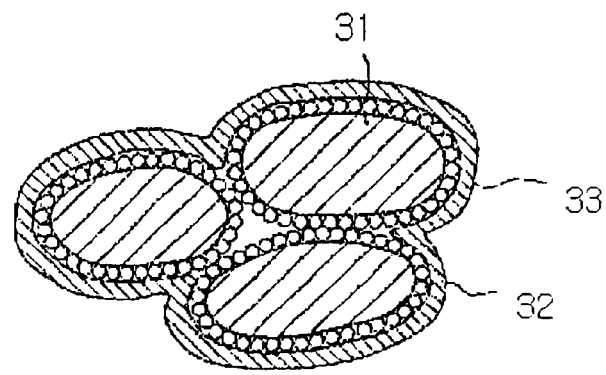
FIG. 4 is a schematic diagram showing a negative active material according to another embodiment of the present invention.

The negative electrode of the present invention is shown in FIGS. 2 to 4. The negative electrode material shown in FIG. 2 can be prepared by attaching the silicon micro-particle 12 to the surface of the graphite particle 11, and the carbon film 13 is partially or totally on the surface of the graphite particle.

In FIG. 3, as the negative electrode material, the silicon micro-particles 22 attached on the surface of a plurality of graphite particles 21, and the carbon film 23 which coats partially or totally the graphite particles, and which adheres a plurality of graphite particles 21 are shown.

The negative electrode material in FIG. 4 may be prepared by coating a mixture of one or more graphite particles 31 and silicon micro-particles 32 with a carbon film 33, or by partially or totally forming a carbon film 33 on one or more graphite particles 31 on which are attached silicon micro-particles 32 or on a mixture of graphite particle 31 and silicon micro-particles 32.

The negative electrode material of the present invention may be any form shown in FIGS. 2 to 4.

As the graphite particle, artificial graphite, natural graphite, and graphitized-carbon fiber may be used. The graphite particle may be intercalated into or deintercalated from lithium.

The particle size of the graphite particle is preferably from 5 $\mu$m to 40 $\mu$m.

The silicon micro-particle is attached on the surface of the graphite particle. In particular, FIG. 4 shows that a plurality of the silicon micro-particles are adjacently and densely on the surface of the graphite particle.

The content of the silicon particle is preferably from 3 wt % to 10 wt %. In the case where the content of the silicon micro-particle is more than 10 wt %, the charge and discharge efficiency of the negative electrode decreases. In the case where the content of the silicon micro-particle is less than 3 wt %, the energy density of the negative electrode decreases.

The carbon film coats the surface of the graphite particle. The thickness of the carbon film is about a few Å, and it can fix the silicon micro-particle on the surface of the graphite particle. Additionally, as shown in FIG. 3 and FIG. 4, the carbon film helps to adhere the graphite particles. The carbon film may be prepared by heat-treating a polymer material such as vinyl resin, cellulose resin, phenol resin, pitch resin, or tar resin. Since the carbon film is amorphous and not graphitized, the decomposition of the electrolyte caused by the contact between the electrolyte and the negative active material does not occur so that the decomposition of the electrolyte can be prevented and the charge and discharge efficiency of the negative active material can be improved.

Therefore, the carbon film, which coats graphite having high reactivity with the electrolyte, prevents the decomposition of the electrolyte. Additionally, the silicon micro-particle having relatively high specific resistance can be firmly attached on the graphite particle due to the carbon film, which prevents the silicon micro-particle from being separated from the graphite particle, and all silicon micro-particles participate in the charge and discharge. In addition, since the carbon film is prepared by calcinating the polymer material, the graphite particle can be thinly coated with the carbon film, and the coated carbon film does not prevent the reaction of lithium with the graphite particle or the silicon micro-particle.

During charging of the negative active material, lithium ion is first intercalated into the silicon micro-particle, and then lithium ion is intercalated into the graphite particle. Because the charge and discharge potential of the silicon micro-particle versus Li is slightly higher than that of the graphite particle, lithium ion is first intercalated into the silicon micro-particle.

During discharging of the negative active material, opposite to the charging, the lithium ion is first deintercalated from the graphite particle, and then lithium ion is deintercalated from the silicon micro-particle.

The discharge curves of the graphite particle and the silicon micro-particle appear flat, and both the graphite particle and the silicon micro-particle have good discharge characteristics. The difference between the discharge potential of the graphite particle and the silicon micro-particle is about 0.25 V, and is small. Both their discharge curves appear continuous. In particular, the regular curves are shown at 0.5 V near from a potential of silicon micro-particle. Therefore, the discharge capacity can be improved, and the discharge curves have a greater flat region, by attaching a silicon micro-particle to the graphite particle.

The positive electrode is formed by coating a collector, such as aluminum foil, with a positive active material composition. The positive active material may be a compound in which lithium intercalation occurs, for example $LiMn_2O_4$, $LiCoO_2$, $LiNiO_2$, $LiFeO_2$, $V_2O_5$, TiS, or MoS.

As the separator, a porous olefin film such as polyethylene and polypropylene may be used.

The electrolyte includes an aprotic solvent and a solute. The aprotic solvent includes propylene carbonate, ethylene carbonate, butylene carbonate, benzonitrile, acetonitrile, tetrahydrofuran, 2-methyltetrahydrofuran, γ-butyrolactone, dioxolane, 4-methyl dioxolane, N,N-dimethyl formamide, dimethyl acetamide, dimethyl sulfoxide, dioxane, 1,2-dinitrobenzene, dimethyl isopropyl carbonate, ethyl propyl carbonate, dipropyl carbonate, diisopropyl carbonate, dibutyl carbonate, diethylene glycol,dimethyl ether, or a mixture thereof. The solutes includes $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlCl_4$, $LiN(C_xF_{2x+1}SO_2)(C_yF_{2y+1}SO_2)$ (x and y are natural numbers), LiCl, or LiI. Instead of the liquid electrolyte, a solid electrolyte can be used, and it is preferable that a polymer having high ionic conductivity is used. A polymer, such as polyethylene oxide, polypropylene oxide, or polyethylene imine, may be used. In addition, a polymer gel added to the solvents and the solutes can be used as an electrolyte.

The negative active material of the present invention is produced by attaching silicon micro-particles to graphite particles, subsequently forming a polymer film which covers the graphite to form a precursor for the negative active material, and calcinating the precursor. At this time, the polymer film is carbonized to convert it to a carbon film, thereby forming a negative active material with a carbon film.

In the step of forming the precursor, the graphite particle is combined with silicon micro-particle by dry-mixing or wet-mixing. In wet-mixing, a dispersion solvent such as ethanol is preferably used.

The polymer film is prepared by dissolving a polymer material in a solvent, mixing the solution with a mixture of silicon micro-particles and graphite particles, and eliminating the solvent from the mixture.

As the polymer material, one selected from vinyl resin, cellulose resin, phenol resin, pitch resin, or tar resin is preferably used. More preferably, polyvinyl alcohol is used.

The calcination step is performed at a temperature range between a carbonization temperature of the polymer material and 1400° C. (1637 K). In the case where the precursor is calcined at a temperature greater than the carbonization temperature of the polymer material, the polymer material is carbonized to form a carbon film. For example, if polyvinylalcohol is used for the polymer material, the calcination step is preferably performed at 800° C. (1073 K).

If the calcination temperature is higher than 1400° C. (1637 K), silicon is carbonized to generate SiC. In addition, if the polymer film is carbonized, or the calcination is performed at the carbonization temperature of the polymer material, the carbon film may be graphitized.

According to the method of preparation, the negative active material of the present invention is prepared. Since the carbon film is formed after attaching the silicon micro-particles to the graphite particles, silicon micro-particles can be firmly attached on the surface of the graphite particles.

The negative material includes silicon micro-particle that can form an alloy with lithium, and the silicon micro-particle may intercalate or deintercalate with lithium. Therefore, the negative material has a greater energy density.

Since the carbon film that coats the graphite particle is amorphous carbon which does not react with electrolyte during charge and discharge, the decomposition of the electrolyte solution can be prevented. Therefore, the negative material has a higher charge and discharge efficiency.

The carbon film of the negative material partially or totally coats the graphite particle, and the carbon film attaches the silicon micro-particle to the surface of the graphite particle. Therefore, the silicon micro-particle relatively having higher specific resistance is not separated from the graphite particle and all silicon micro-particles participate in the charge and discharge.

The following examples further illustrated the present invention.

EXAMPLE 1

The Preparation of the Negative Electrode

Natural graphite particles having the average particle size of 15 μm were added to silicon micro-particles having the average particle size of 12 μm, and then they were wet-mixed by adding ethanol to the mixture to prepare an ethanol solution.

Polyvinyl alcohol resin was added to the ethanol solution, and they were stirred to vaporize ethanol from the mixture of the ethanol solution and polyvinyl alcohol. As a result, a negative active material precursor attached with the silicon micro-particle and coated with a polyvinylalcohol film was obtained.

The precursor was calcined at 1000° C. (1273 K) under the vacuum atmosphere. At this time, the polyvinyl alcohol film was carbonized to form a carbon film.

As the result, a negative active material with 5 wt % of silicon micro-particle and 2 wt % of the carbon film was produced.

Fabricating of Test Cell for Charge and Discharge

Polyvinylidene fluoride was added into the negative material, and N-methyl pyrrolidone was added to the mixture to prepare a slurry. The slurry was coated on 14 μm-copper foil by a doctor-blade. Then, N-methylpyrrolidone was dried under 120° C. at vacuum atmosphere for 24 hours to vaporize N-methylpyrrolidone. The thickness of the coated slurry was 100 μm. The content of polyvinylidene fluoride in the slurry was 8 wt %.

The coated copper foil was cut into a coin shape with an average diameter of 13 mm to produce a negative electrode.

Using the negative electrode as a working electrode, lithium metal as a counter electrode, a coin-type test half-cell was fabricated. A separator was interposed between the negative and the counter electrodes. As an electrolyte, 1M LiPF$_6$ in a mixture of propylene carbonate, diethyl carbonate and ethylene carbonate was used.

A charge and discharge test was performed with a charge current density of 0.2 C, a charge terminal voltage of 0 V (Li/Li$^+$), a discharge current density of 0.2 C, and a discharge terminal voltage of 1.6 V (Li/Li$^+$). The charge and discharge capacity of the first cycle was measured. In addition, the discharge capacity to charge capacity at the initial cycle (charge and discharge efficiency) was measured. The results are presented in Table 1.

TABLE 1

| | Charge capacity at a first cycle [mAh/g] | Discharge capacity at a first cycle [mAh/g] | Discharge capacity at 0.5 cut-off V [mAh/g] | Charge and discharge efficiency [%] |
|---|---|---|---|---|
| Example 1 | 494 | 447 | 414 | 90.3 |

As shown in Table 1, the discharge capacity of Example 1 was 447 mAh/g and is greater than that of natural graphite of 360 mAh/g. In particular, Example 1 had a higher discharge capacity to 0.5 V (Li/Li$^+$) of 414 mAh/g and a higher charge and discharge efficiency of 90.3%.

Figure 5:
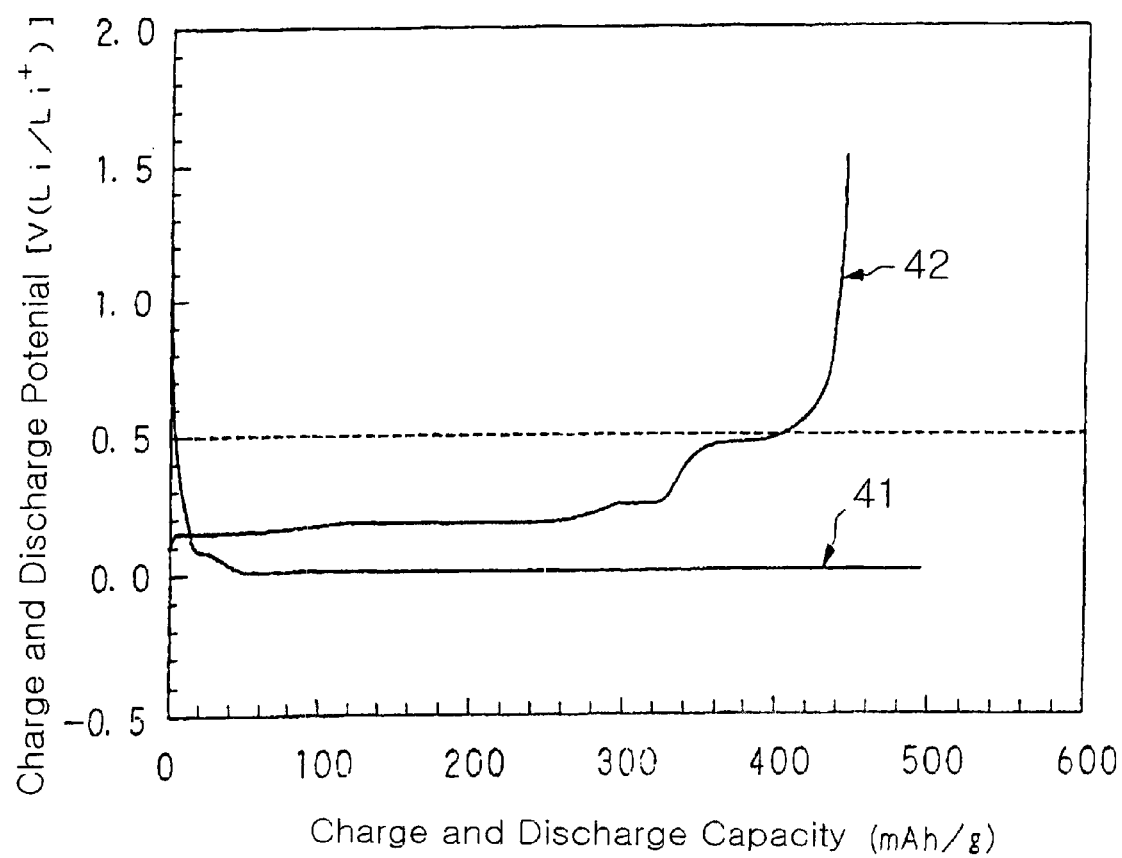
FIG. 5 is a graph showing charge and discharge characteristics at the first cycle.

As shown in FIG. 5, the discharge curve 42 had two curves at more than 340 mAh/g. The first curve was the discharge curve 42 during the deintercalation of lithium ion from graphite particle. The second curve was the discharge curve 42 during the deintercalation of lithium ion from silicon micro-particle. Both the curves versus a voltage were displayed flat.

The negative active material of the present invention continuously exhibited the discharge curves by the graphite particle and silicon micro-particle and both the curves were flat. Thus, the negative active material exhibits higher discharge capacity.

The flat discharge curve 42 at region by 0.5V permits a high voltage-required device, e.g. a cellular phone used with the rechargeable lithium battery of the present invention, to be employed for a long time. In addition, the reliability of the working of the device can be guaranteed.

The scope of the present invention is not limited to the Example, and various modifications can be made without departing from the sprit of the present invention. For example, the Example was related to the cylindrical lithium cell, but the present invention can be applied to prism, coin or sheet-shaped cells.

According to the present invention, the negative active material for the rechargeable lithium battery includes silicon micro-particles attached onto the surface of a graphite particle, and a carbon film partially or totally on the graphite particle. The silicon micro-particle is capable of forming alloy with lithium. The silicon micro-particle may be capable of absorbing or releasing lithium, as does graphite, during the charge and the discharge and the energy density of the negative active material can increase. Since the charge and discharge potential of the silicon micro-particle is similar to that of the graphite particle, and the discharge voltage of the silicon micro-particle is relatively flatness, discharge capacity of the negative active material can be improved.

The negative active material of the present invention includes silicon micro-particle attached on the surface of a plurality of graphite carbon particles, and a carbon film which is partially or totally coated the graphite particles, and which can adhere between the graphite particles. This creates an improvement in the energy density of the negative active material.

The negative active material of the present invention includes a carbon film that is amorphous. Therefore, the negative active material has greater charge and discharge efficiency, since the amorphous carbon film does not react with the electrolyte during the charge and discharge, and the decomposition of the electrolyte can be prevented.

The negative active material of the present invention includes the carbon film formed on the graphite particle and the carbon film which acts as the reaction-prevention layer and prevents the contact between the graphite and the electrolyte. Therefore, the reaction between the negative active material and the electrolyte does not occur so that the decomposition of the electrolyte can be prevented and the charge and discharge efficiency can be improved.

The carbon film partially or totally coats the graphite particles. The carbon film also coats the silicon micro-particle, and can firmly attach the silicon micro-particle onto the surface of the graphite particle. Therefore, the silicon micro-particle having relatively high specific resistance does not separate from the graphite particle, and all silicon micro-particles participate in the charge and discharge.

Additionally, the carbon film is formed by calcinating a polymer material that is attached on the graphite particle. Therefore, a uniform and thin carbon film can be formed on the graphite particle, and the carbon film does not prevent the reaction of lithium with the graphite particle or silicon micro-particle.

The rechargeable lithium battery including the negative electrode has a higher energy density, a higher discharge capacity, and a longer cycle life.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative active material for a rechargeable lithium battery comprising:
    at least one graphite particle;
    at least one silicon micro-particle attached on a surface of the graphite particle; and
    an amorphous carbon film coated on the graphite particle and the silicon micro-particle.

2. The negative active material according to claim 1, wherein the silicon micro-particle is firmly attached on the surface of the graphite particle.

3. The negative active material according to claim 1, wherein the carbon film is a reaction-preventing layer for preventing a reaction between the graphite particle and an electrolyte.

4. The negative active material according to claim 1, wherein in the carbon film partially or totally coats the graphite particle to firmly attach the silicon micro-particle on the graphite particle.

5. The negative active material according to claim 1, wherein the carbon film is prepared by coating a polymer material on the graphite particle and calcinating the resulting material.

6. The negative active material according to claim 5, wherein the polymer material is at least one selected from a group consisting of vinyl resin, cellulose resin, phenol resin, pitch resin, and tar resin.

7. A negative active material for a rechargeable lithium battery comprising:
    at least one graphite particle;
    at least one silicon micro-particle attached on a surface of the graphite particle; and
    a carbon film coated on the graphite particle and the silicon micro-particle, wherein the content of the at least one silicon micro-particle is from 3 to 10 percent by weight, based on the total weight of the negative active material.

8. A negative active material comprising:
    a core comprising one or more graphite particles and one or more silicon micro-particles; and
    an amorphous carbon film coated on the core.

9. The negative active material according to claim 8, wherein the one or more silicon micro-particles are firmly attached on the surface of the one or more graphite particles.

10. The negative active material according to claim 8, wherein the carbon film is a reaction-protecting layer for preventing the reaction between the graphite particle and an electrolyte.

11. The negative active material according to claim 8, wherein the carbon partially or totally coats the graphite particle, and fixes the one or more silicon micro-particles on the surface of the one or more graphite particles.

12. The negative active material according to claim 8, wherein the carbon film is formed by coating a polymer material to the one or more graphite particles and calcinating the resulting material.

13. The negative active material according to claim 12, wherein the polymer material is at least one selected from a group consisting of vinyl resin, cellulose resin, phenol resin, pitch resin, and tar resin.

14. A negative active material comprising:
    a core comprising one or more graphite particles and silicon micro-particles; and
    a carbon film coated on the core, wherein the content of one or more silicon micro-particles is from 3 to 10 percent by weight.

15. A method of preparing a negative active material comprising:
    attaching a silicon micro-particle to a graphite particle;
    coating a polymer film on the graphite particle to prepare a negative active material precursor; and
    calcinating the negative active material precursor such that the polymer film is carbonized to obtain a carbon film.

16. The method of preparing the negative active material according to claim 15, wherein the calcination step is performed at a temperature between carbonization temperature of the polymer film and 1400° C.

\* \* \* \* \*